(12) United States Patent  
Chen et al.

(10) Patent No.: US 12,524,367 B2
(45) Date of Patent: Jan. 13, 2026

(54) BUS CONFIGURATION SYSTEM AND METHOD THEREOF

(71) Applicant: RICHTEK TECHNOLOGY CORP., Hsinchu County (TW)

(72) Inventors: Ching-Yi Chen, Hsinchu County (TW); Hsing-Shen Huang, Hsinchu County (TW); Bo-Jyun Huang, Hsinchu County (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 166 days.

(21) Appl. No.: 18/426,261

(22) Filed: Jan. 29, 2024

(65) Prior Publication Data

US 2024/0311327 A1 Sep. 19, 2024

Related U.S. Application Data

(60) Provisional application No. 63/452,447, filed on Mar. 16, 2023.

(51) Int. Cl.
*G06F 13/42* (2006.01)
*G06F 1/10* (2006.01)
*G06F 13/40* (2006.01)

(52) U.S. Cl.
CPC .......... *G06F 13/4256* (2013.01); *G06F 1/10* (2013.01); *G06F 13/4072* (2013.01)

(58) Field of Classification Search
CPC ..... G06F 13/4256; G06F 13/4072; G06F 1/10
See application file for complete search history.

(56) References Cited

U.S. PATENT DOCUMENTS

| | | | |
|---|---|---|---|
| 2003/0093256 A1* | 5/2003 | Cavanagh | G06F 30/33 703/14 |
| 2010/0327923 A1* | 12/2010 | Pyeon | G06F 13/1689 327/145 |
| 2014/0163726 A1* | 6/2014 | Shoenfeld | G16H 20/13 700/241 |
| 2018/0128982 A1* | 5/2018 | Jensen | G02B 6/44715 |
| 2019/0188174 A1 | 6/2019 | Raja | |
| 2022/0188257 A1 | 6/2022 | Heckroth | |

FOREIGN PATENT DOCUMENTS

| | | |
|---|---|---|
| CN | 114756498 A | 7/2022 |
| TW | 200819992 | 5/2008 |
| TW | 200947958 | 11/2009 |
| TW | 201432468 A | 8/2014 |
| TW | 201640368 A | 11/2016 |
| TW | 201911750 A | 3/2019 |

* cited by examiner

*Primary Examiner* — Henry Tsai
*Assistant Examiner* — Aurangzeb Hassan
(74) *Attorney, Agent, or Firm* — Winston Hsu

(57) ABSTRACT

A bus configuration system includes a plurality of driver integrated circuits (ICs) coupled sequentially on a daisy chain, and a bus controller coupled to the plurality of driver ICs. Each driver IC includes a plurality of ports. The bus controller is used to generate a port definition code for configuring each port of the each driver IC. The bus controller includes a clock output port used to output a clock signal and a data output port used to output a data signal. When a port of the plurality of ports detects the clock signal, the port is configured as a clock input port.

20 Claims, 9 Drawing Sheets

BUS CONFIGURATION SYSTEM AND METHOD THEREOF

CROSS REFERENCE TO RELATED APPLICATIONS

This application claims the benefit of U.S. Provisional Application No. 63/452,447, filed on Mar. 16, 2023. The content of the application is incorporated herein by reference.

BACKGROUND OF THE INVENTION

1. Field of the Invention

The present invention is related to computer bus, and more particularly to bus configuration system and method thereof.

2. Description of the Prior Art

A driver integrated circuit (IC) is a chip that plays a crucial role in many electronic devices. It acts as an intermediary between a control device, such as a microcontroller or microprocessor, and an output device it needs to power.

Driver ICs come in various types, each designed for a specific purpose. Some of the most common ones include: display drivers, LED drivers, motor drivers and audio drivers. Display drivers are used in LCD screens, OLED displays, and other visual displays. They take the digital data from the source and convert it into the analog voltages needed to control the individual pixels on the screen. LED drivers are used to drive LEDs, which are increasingly popular for lighting and display applications. They regulate the current and voltage supplied to the LEDs. Motor drivers are used to control electric motors, allowing them to be turned on and off, change direction, and adjust speed. Audio drivers are used to amplify audio signals and drive speakers or headphones and to add special effects like bass boost or equalization.

Driver ICs are generally coupled in a dual line bus (clock and data), for example, $I^2C$ and UART, and are often interconnected in series. Some jumper wires are often necessary for wiring crossover if the driver ICs are a surface mount devices (SMD) on a single layer printed circuit board (PCB). The layout can be complex as hundreds of driver ICs are interconnected together. Moreover, heat dissipation becomes a challenge. Hence, there needs a solution for simplifying layouts on PCBs with hundreds of driver ICs.

SUMMARY OF THE INVENTION

An embodiment provides a bus configuration system including a plurality of driver integrated circuits (ICs) coupled sequentially on a daisy chain, and a bus controller coupled to the plurality of driver ICs. Each driver IC includes a plurality of ports. The bus controller is used to generate a port definition code for configuring each port of the each driver IC. The bus controller includes a clock output port used to output a clock signal and a data output port used to output a data signal. When a port of the plurality of ports detects the clock signal, the port is configured as a clock input port.

Another embodiment provides a bus configuration system including a plurality of driver integrated circuits (ICs) coupled sequentially on a daisy chain, and a bus controller coupled to the plurality of driver ICs. Each driver IC includes a first port, a second port, a third port and a fourth port, and a port mapping rule. The bus controller includes a clock output port used to output a clock signal, and a data output port used to output a data signal. When a port of the first port, the second port, the third port and the fourth port detects the clock signal, the port is configured as a clock input port.

Another embodiment provides a bus configuration method implemented by a plurality of driver integrated circuit (IC) coupled on a daisy chain. Each driver IC includes a first port, a second port, a third port and a fourth port, and a port mapping rule. The method includes receiving a clock signal via a port from the first, second, third and fourth port of an Nth IC on the daisy chain, configuring the port received the clock signal to be a clock input port, configuring the first port, the second port, the third port and the fourth port according to the port mapping rule, and outputting the clock signal via the clock output port to an (N+1)th driver IC. N is a positive integer.

These and other objectives of the present invention will no doubt become obvious to those of ordinary skill in the art after reading the following detailed description of the preferred embodiment that is illustrated in the various figures and drawings.

DETAILED DESCRIPTION

The following description is directed to certain implementations for the purposes of describing innovative aspects of this disclosure. However, a person having ordinary skill in the art will readily recognize that the teachings herein can be applied in a multitude of different ways.

A driver integrated circuit (IC) controls the operation of a device or system. It can be used to drive motors, light emitting diodes (LEDs), displays, and other components. The placement and routing of the driver ICs and its connections on a printed circuit board (PCB) are crucial to the performance of the system. The driver IC on a PCB layout should be designed to optimize the performance, reliability, and efficiency of the device or system. Some factors to consider when designing a driver IC on a PCB layout are: the size and shape of the driver IC and its package; the power supply and ground connections of the driver IC; the signal integrity and noise immunity of the driver IC; the thermal management and heat dissipation of the driver IC; the compatibility and interoperability of the driver IC with other components on the PCB. The layout can be complex as hundreds of driver ICs are interconnected together, thereby affecting performance of the system. The following description provides a solution to such a problem.

Figure 1:
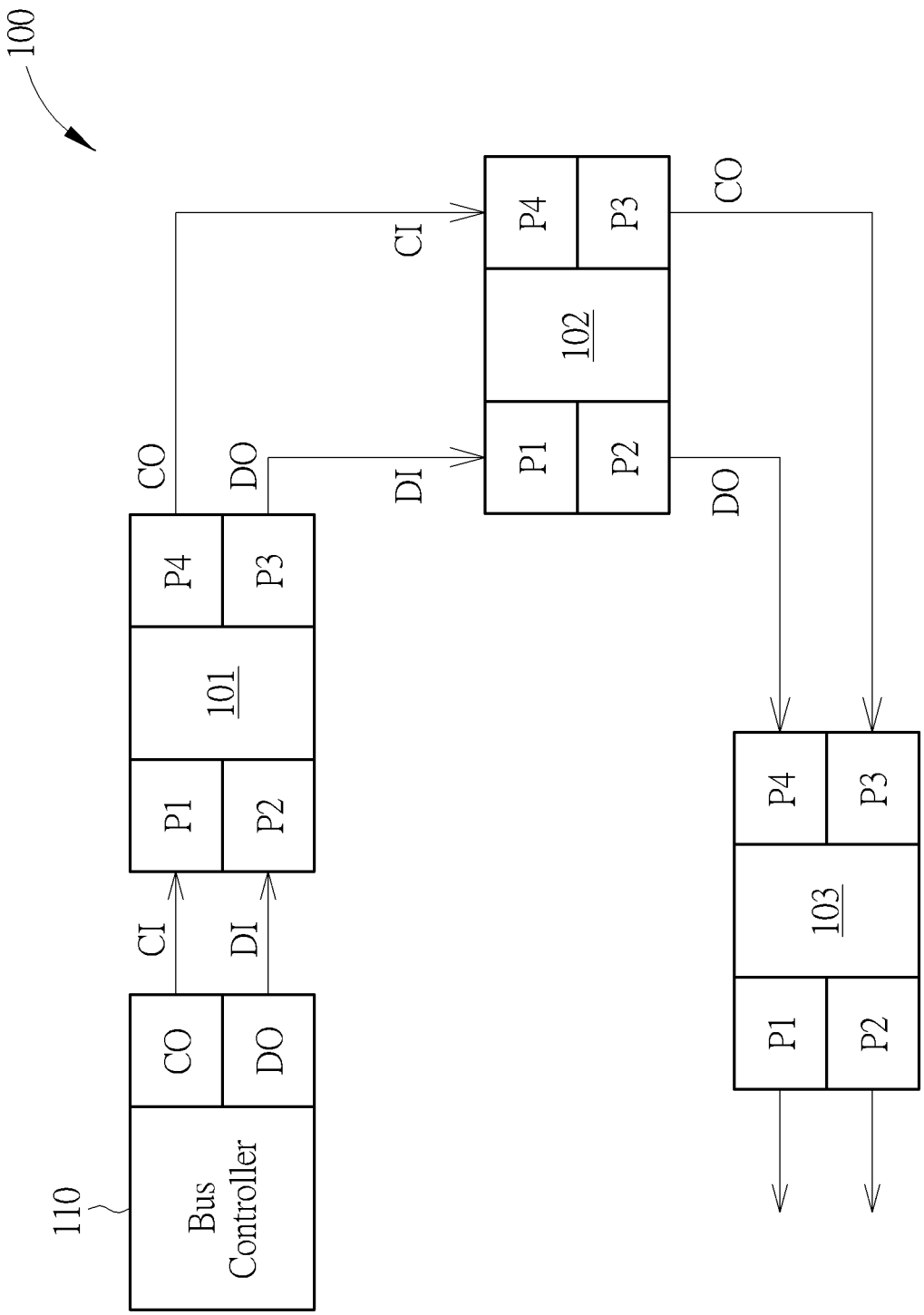
FIG. 1 illustrates a bus configuration system of an embodiment.

FIG. 1 illustrates a bus configuration system 100 of an embodiment. The bus configuration system 100 includes a plurality of driver ICs coupled sequentially on a daisy chain, and a bus controller 110 coupled to the plurality of driver ICs. The bus controller 110 is used to generate a port definition code for configuring each port of the each driver IC. The bus controller 110 includes a clock output port (CO) for outputting a clock signal, and a data output port (DO) for outputting a data signal.

In this illustration, driver ICs 101, 102 and 103 are shown as an example. The driver ICs 101, 102 and 103 each have ports P1, P2, P3 and P4. Each port P1, P2, P3 or P4 can be assigned to perform a specific function, including: clock input (CI), clock output (CO), data input (DI) or data output (DO). Therefore, the coupling of the driver ICs can follow two bus lines, namely clock and data. The clock output port of the bus controller 110 is coupled to the clock input port (e.g., port P1) of the driver IC 101, and the data output port of the bus controller 110 is coupled to the data input port (e.g., port P2) of the driver IC 101. In the same manner, the clock output port (e.g., port P4) of the driver IC 101 is coupled to the clock input port (e.g., port P4) of the driver IC 102, and the data output port (e.g., port P3) of the driver IC 101 is coupled to the data input port (e.g., port P1) of the driver IC 102. The same applies to the interconnection between the driver ICs 102 and 103. Hence, the clock signal can propagate from the clock output port of the bus controller 110 through the driver ICs 101, 102 and 103 to the last driver IC on the daisy chain via the clock input port and the clock output ports. In the same manner, the data signal can propagate from the clock output port of the bus controller 110 through the driver ICs 101, 102 and 103 to the last driver IC on the daisy chain the via the clock input port and the clock output ports. The bus configuration system 100 as illustrated can include Inter-Integrated Circuit (I²C), Universal Asynchronous Receiver/Transmitter (UART) and the equivalent technology.

In the prior art, the function (e.g., clock input or data input) of each port P1 to P4 is fixed by the manufacturer of the driver ICs. In the embodiments, the function of the ports P1, P2, P3 and P4 of each driver IC can be configured with certain flexibility during the initialization of the bus. In the following paragraphs, the configuration process of each port will be described in more detail.

Figure 2:
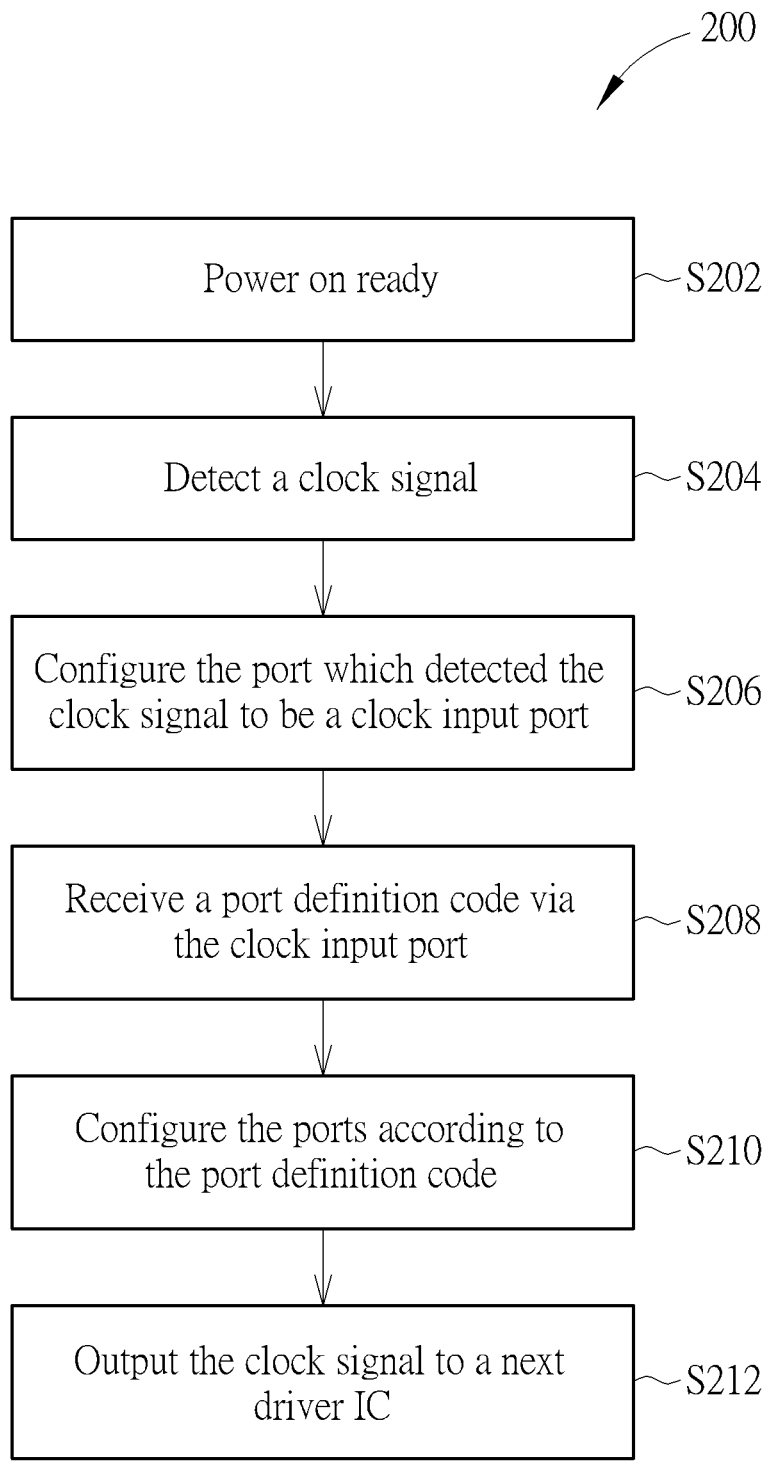
FIG. 2 is a flowchart illustrating a bus configuration method implemented on bus configuration system of FIG. 1.

FIG. 2 is a flowchart illustrating a bus configuration method 200 implemented on bus configuration system 100. The bus configuration method 200 is implemented after power on during the initialization phase of the bus (e.g., I²C or UART). It includes the following steps performed by each driver IC:

S202: Power on ready;
S204: Detect a clock signal;
S206: Configure the port which detected the clock signal to be a clock input port;
S208: Receive a port definition code via the clock input port;
S210: Configure the ports P1-P4 according to the port definition code; and
S212: Output the clock signal via the clock output port to a next driver IC.

The method 200 can include an optional step to confirm whether the configuration is correct by checking whether the configuration of the clock input port and/or the data input port of the driver IC matches the port definition code. Furthermore, the clock signal can optionally include an embedded check code (e.g., 110110) to avoid false detection from a glitch. If the driver IC detects the embedded check code in a received signal, it can confirm that the received signal is in fact the clock signal, thus avoiding false detection.

TABLE 1

| Code Number | P1 | P2 | P3 | P4 |
|---|---|---|---|---|
| 1 | CI | DI | CO | DO |
| 2 | CI | DI | DO | CO |
| 3 | CI | CO | DI | DO |
| 4 | CI | CO | DO | DI |
| 5 | CI | DO | DI | CO |
| 6 | CI | DO | CO | DI |
| 7 | DI | CI | CO | DO |
| 8 | DI | CI | DO | CO |
| 9 | DI | CO | CI | DO |
| 10 | DI | CO | DO | CI |
| 11 | DI | DO | CI | CO |
| 12 | DI | DO | CO | CI |
| 13 | CO | DI | CI | DO |
| 14 | CO | DI | DO | CI |
| 15 | CO | CI | DI | DO |
| 16 | CO | CI | DO | DI |
| 17 | CO | DO | DI | CI |
| 18 | CO | DO | CI | DI |
| 19 | DO | DI | CO | CI |
| 20 | DO | DI | CI | CO |
| 21 | DO | CO | DI | CI |
| 22 | DO | CO | CI | DI |
| 23 | DO | CI | DI | CO |
| 24 | DO | CI | CO | DI |

Table 1 shows the various combinations of the port definition codes in this embodiment. The port definition codes are generated by the bus controller 110 and received and propagated by the driver ICs 101, 102 and 103 until the last driver IC on the daisy chain.

In the example of code number 1, the port P1 can be configured as the clock input port; the port P2 can be configured as the data input port; the port P3 can be configured as the clock output port; the port P4 can be configured as the data output port.

In the example of code number 12, the port P1 can be configured as the data input port; the port P2 can be configured as the data output port; the port P3 can be configured as the clock output port; the port P4 can be configured as the clock input port.

Figure 3:
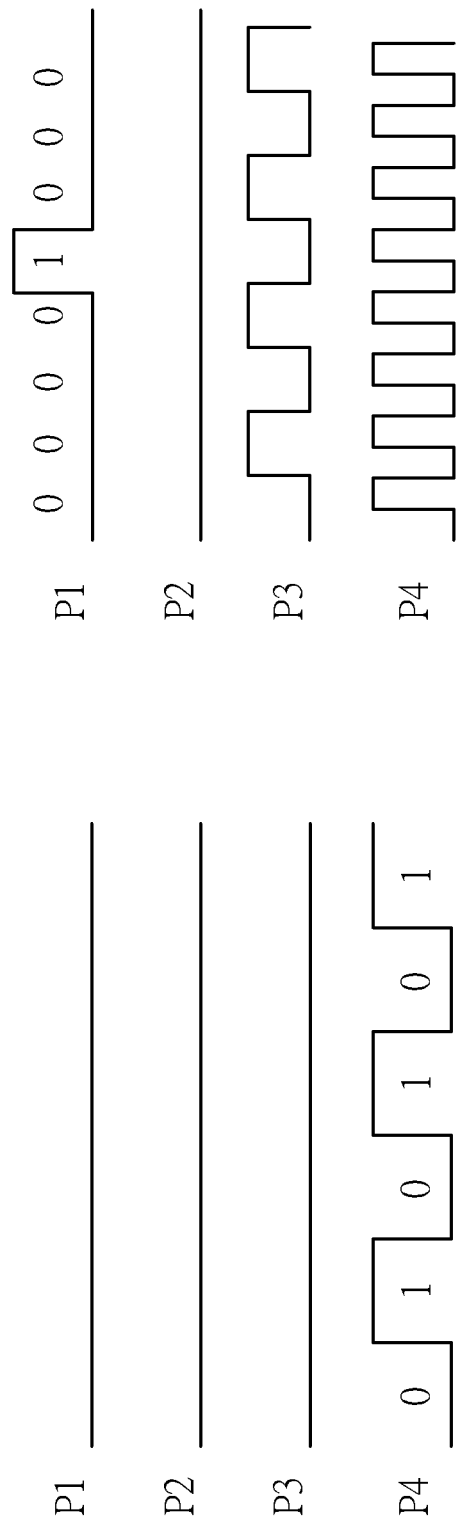
FIG. 3A and FIG. 3B illustrate signal diagrams of the driver IC of FIG. 1.

FIGS. 3A and 3B illustrate signal diagrams of the driver IC 102. In the illustration of FIG. 3A, the port P4 detects the clock signal and is configured to be the clock input port. Then, the driver IC 102 can receive a port definition code 001100 (i.e., binary number of code number 12) via the port P4 (i.e., clock input port). Subsequently, the driver IC 102 can configure the ports P1-P4 according to code number 12. That is, the port P1 can be the data input port; the port P2 can be the data output port; the port P3 can be the clock output port; the port P4 can be the clock input port.

In the illustration of FIG. 3B, the signal diagram shows that after the ports P1 to P4 are configured according to the code number 12, the port P1 is configured to be the data input port; the port P2 is configured to be the data output port; the port P3 is configured to be the clock output port; the port P4 is configured to be the clock input port. At this point, the driver IC 102 can operate at high speed with all ports functioning, such that the signals can propagate via two input ports and two output ports.

Figure 4:
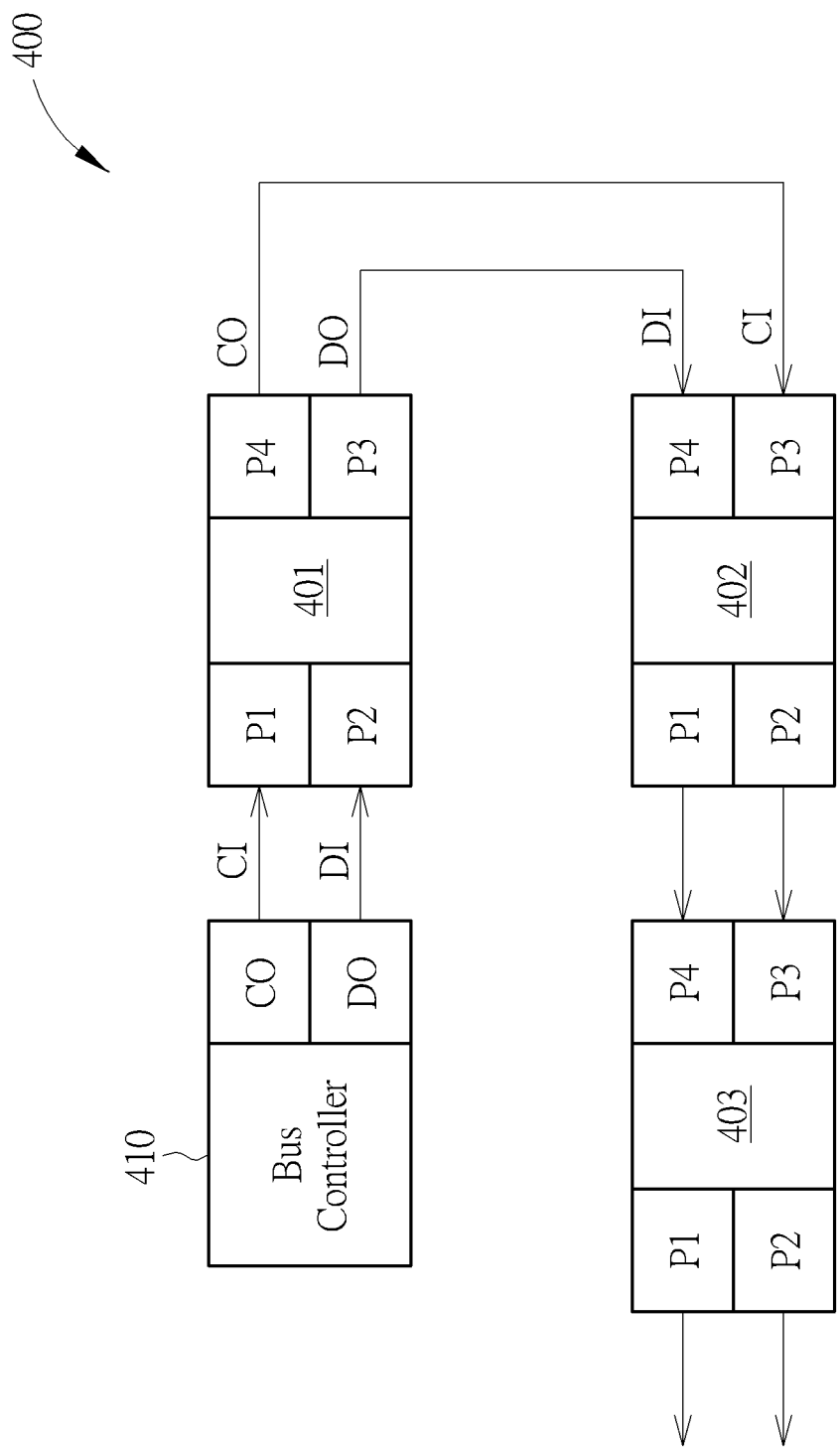
FIG. 4 illustrates a bus configuration system of another embodiment.

FIG. 4 illustrates a bus configuration system 400 of an embodiment. The bus configuration system 400 includes a plurality of driver integrated circuits (ICs) coupled sequentially on a daisy chain, and a bus controller 410 coupled to the plurality of driver ICs. The bus controller 410 is used to generate a port definition code for configuring each port of the each driver IC. The bus controller includes a clock output port for outputting a clock signal, and a data output port for outputting a data signal.

In this illustration, driver ICs 401, 402 and 403 are shown as an example. The driver ICs 401, 402 and 403 each have ports P1, P2, P3 and P4. Each port P1, P2, P3 or P4 can be assigned to perform a specific function, including: clock input (CI), clock output (CO), data input (DI) or data output (DO). Therefore, the coupling of the driver ICs can follow two bus lines, namely clock and data. The clock output port of the bus controller 410 is coupled to the clock input port (e.g., port P1) of the driver IC 401, and the data output port of the bus controller 410 is coupled to the data input port (e.g., port P2) of the driver IC 401. In the same manner, the clock output port (e.g., port P4) of the bus driver IC 401 is coupled to the clock input port (e.g., port P3) of the driver IC 402, and the data output port (e.g., port P3) of the driver IC 401 is coupled to the data input port (e.g., port P4) of the driver IC 402. The same applies to the interconnection between the driver ICs 402 and 403. Hence, the clock signal can propagate from the clock output port of the bus controller 410 through the driver ICs 401, 402 and 403 to the last driver IC on the daisy chain via the clock input port and the clock output ports. In the same manner, the data signal can propagate from the clock output port of the bus controller 410 through the driver ICs 401, 402 and 403 to the last driver IC on the daisy chain the via the clock input port and the clock output ports. The bus configuration system 400 as illustrated can include I²C, UART and the equivalent technology.

Similar to the embodiment of FIG. 1, the function of the ports P1, P2, P3 and P4 of each driver IC can be configured with certain flexibility during the initialization of the bus in the embodiment of FIG. 4. The key difference is that the functioning ports are group together such that the clock input port and the data input port form a first group, and the clock output port and the data output port form a second group. Thus, if port P1 is configured as the clock input port, the port P2 must be configured as the data input port. This can effectively reduce the number of port definition codes needed to configure the driver ICs. In the following paragraphs, the configuration process of each port will be described in more detail.

Figure 5:
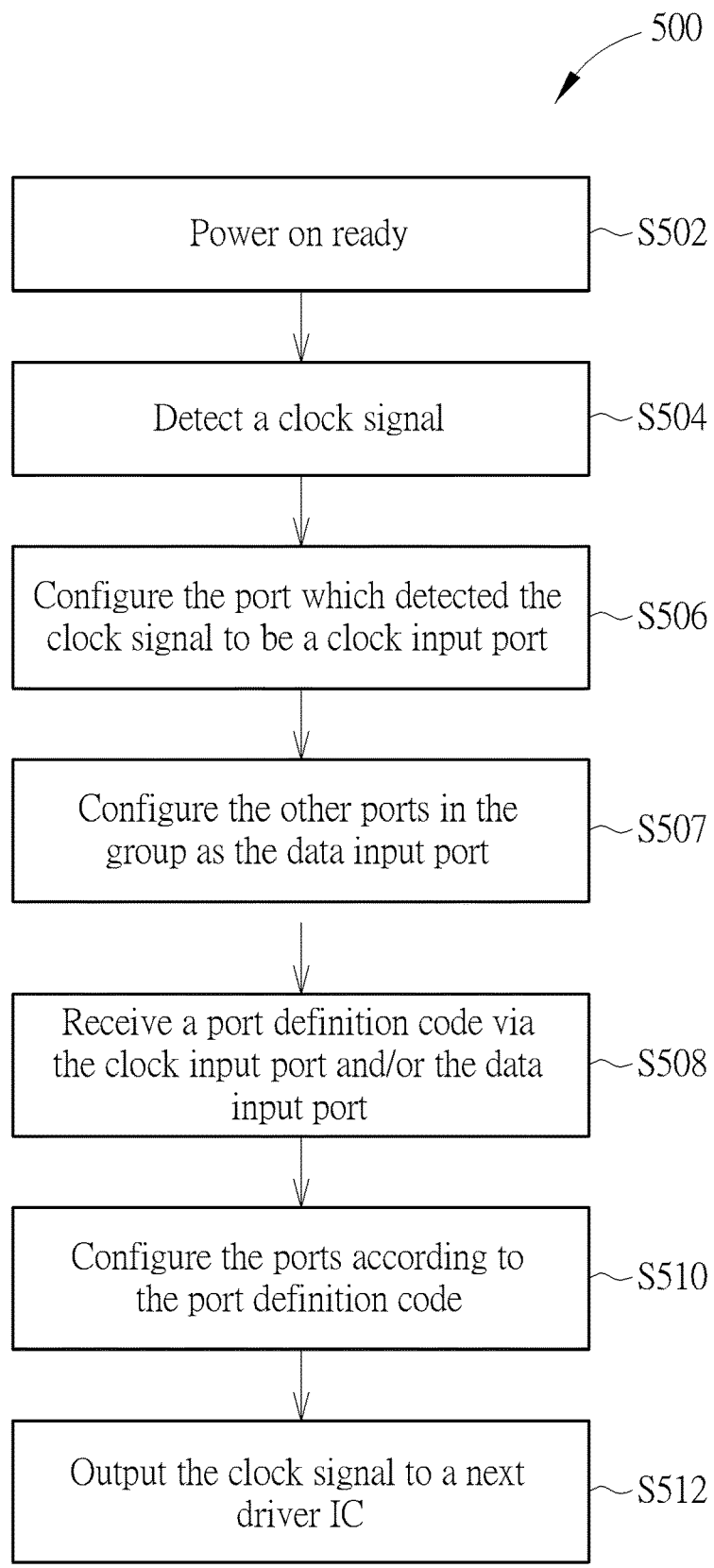
FIG. 5 is a flowchart illustrating a bus configuration method implemented on bus configuration system of FIG. 4.

FIG. 5 is a flowchart illustrating a bus configuration method 500 implemented on bus configuration system 400. The bus configuration method 400 is implemented after power on during the initialization phase of the bus (e.g., I²C or UART). It includes the following steps performed by each driver IC:

S502: Power on ready;
S504: Detect a clock signal;
S506: Configure the port which detected the clock signal to be a clock input port;
S507: Configure the other ports in the group as the data input port;
S508: Receive a port definition code via the clock input port and/or the data input port;
S510: Configure the ports P1-P4 according to the port definition code; and
S512: Output the clock signal via the clock output port to a next driver IC.

The method 500 can include an optional step to confirm whether the configuration is correct by checking whether the configuration of the clock input port and/or the data input port of the driver IC matches the port definition code. Furthermore, the clock signal can optionally include an embedded check code (e.g., 110110) to avoid false detection from a glitch. If the driver IC detects the embedded check code in a received signal, it can confirm that the received signal is in fact the clock signal, thus avoiding false detection.

TABLE 2

| Code Number | P1 | P2 | P3 | P4 |
|---|---|---|---|---|
| 1 | CI | DI | CO | DO |
| 2 | CI | DI | DO | CO |
| 3 | DI | CI | CO | DO |
| 4 | DI | CI | DO | CO |
| 5 | CO | DO | DI | CI |
| 6 | CO | DO | CI | DI |
| 7 | DO | CO | DI | CI |
| 8 | DO | CO | CI | DI |

Table 2 shows the various combinations of the port definition codes in this embodiment. Because the ports are grouped together, the combination of port definition codes can be greatly reduced compared with Table 1. For example, the ports P1 and P2 can form a first group, and the ports P3 and P4 can form a second group. In other words, according to Table 2, the clock input port and the data input port form the first group, and the clock output port and the data output port form the second group.

This method can increase the speed of port configuration and bus initialization because of two reasons. Firstly, the driver ICs (e.g., 401, 402 and 403) can receive the port definition code with two input ports, i.e., the clock input port and the data input port. Second, the number of combination of the port definition codes is reduced, thereby reducing computational time.

The signal diagrams of the driver ICs in the bus configuration system 400 is similar to that of the driver ICs in the bus configuration system 100. Thus, the description is not repeated herein for brevity.

Figure 6:
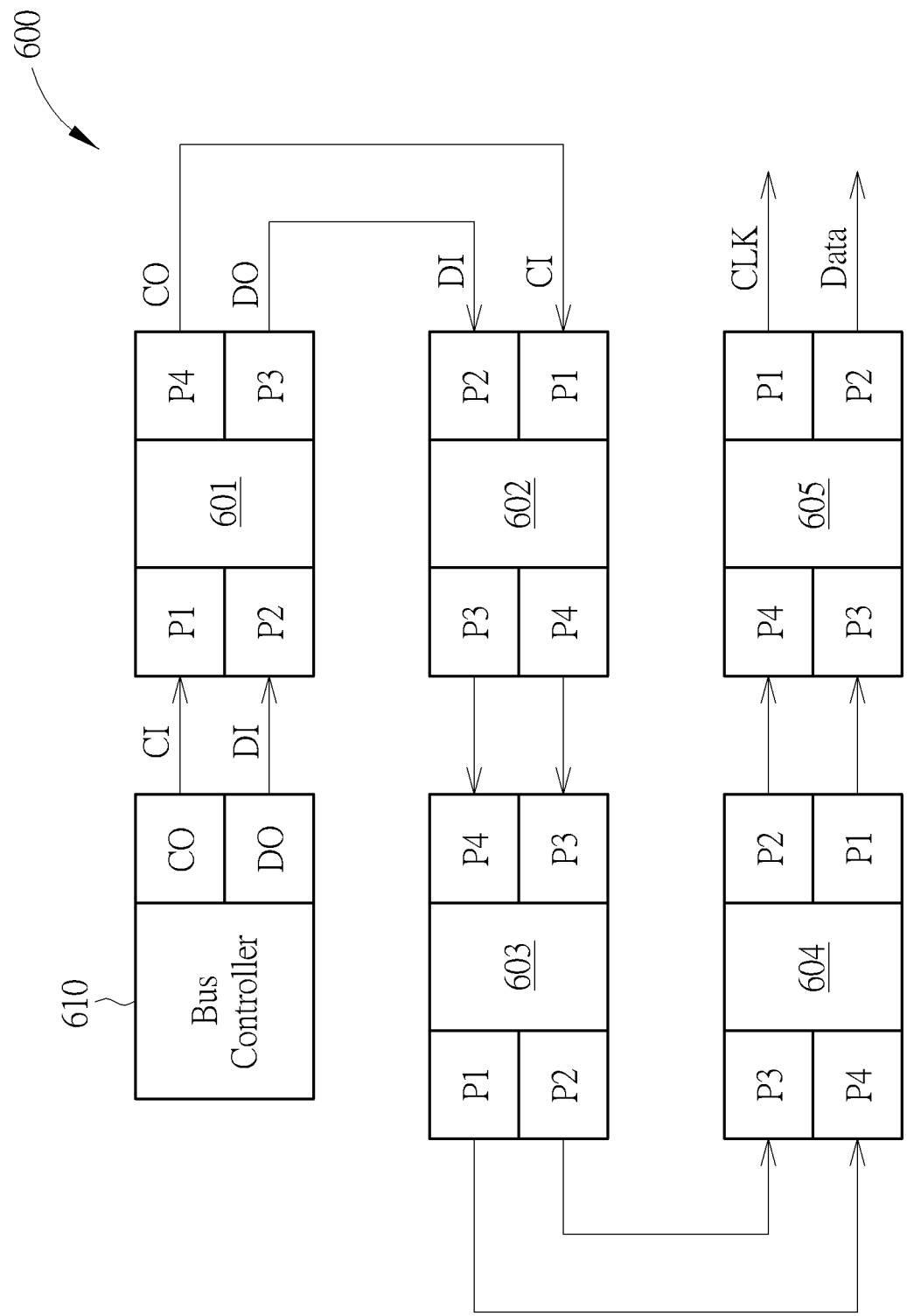
FIG. 6 illustrates a bus configuration system of another embodiment.

FIG. 6 illustrates a bus configuration system 600 of an embodiment. The bus configuration system 600 includes a plurality of driver integrated circuits (ICs) coupled sequentially on a daisy chain, and a bus controller 610 coupled to the plurality of driver ICs. The bus controller 610 is used to generate a port definition code for configuring each port of the each driver IC. The bus controller includes a clock output port for outputting a clock signal, and a data output port for outputting a data signal.

In this illustration, driver ICs 601, 602, 603, 604 and 605 are shown as an example. The driver ICs 601, 602, 603, 604 and 605 each have ports P1, P2, P3 and P4. Each port P1, P2, P3 or P4 can be assigned to perform a specific function, including: clock input (CI), clock output (CO), data input (DI) or data output (DO). Therefore, the coupling of the driver ICs can follow two bus lines, namely clock and data. The clock output port of the bus controller 610 is coupled to the clock input port (e.g., port P1) of the driver IC 601, and the data output port of the bus controller 610 is coupled to the data input port (e.g., port P2) of the driver IC 601. In the same manner, the clock output port (e.g., port P4) of the bus driver IC 601 is coupled to the clock input port (e.g., port P1) of the driver IC 602, and the data output port (e.g., port P3) of the driver IC 601 is coupled to the data input port (e.g., port P2) of the driver IC 602. The same applies to the interconnection between the driver ICs 602 and 603, and so on so forth. Hence, the clock signal can propagate from the clock output port of the bus controller 610 through the driver ICs 601, 602, 603, 604 and 605 to the last driver IC on the daisy chain via the clock input port and the clock output ports. In the same manner, the data signal can propagate from the clock output port of the bus controller 610 through the driver ICs 601, 602, 603, 604 and 605 to the last driver IC on the daisy chain the via the clock input port and the clock output ports. The bus configuration system 600 as illustrated can include I²C, UART and the equivalent technology.

Figure 7:
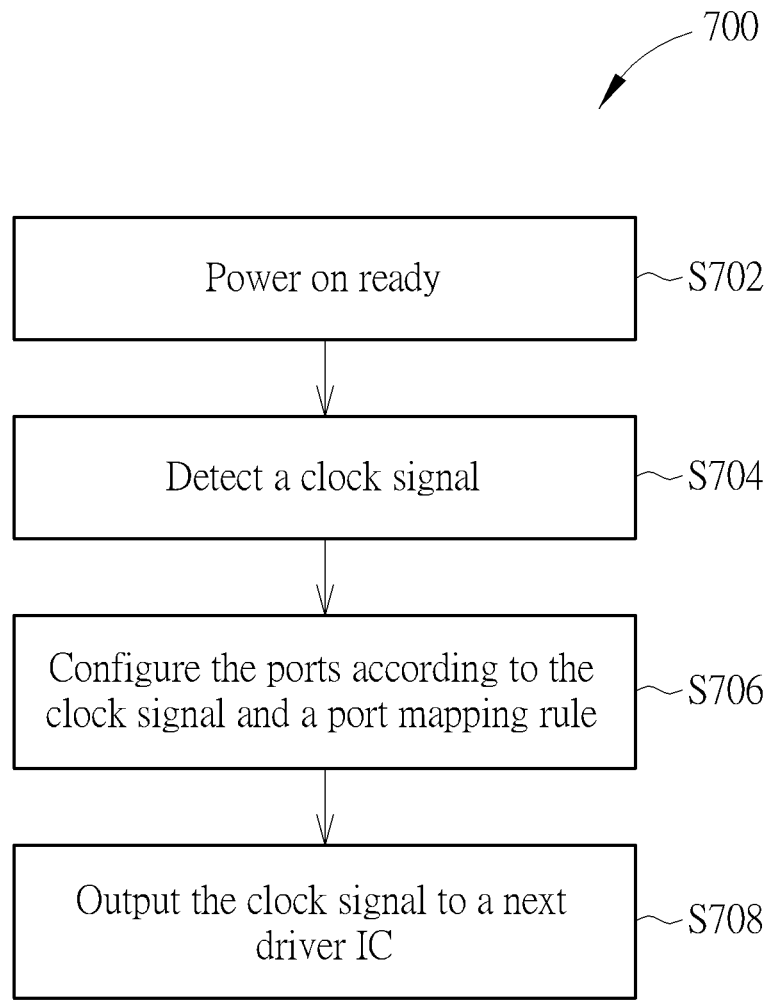
FIG. 7 is a flowchart illustrating a bus configuration method implemented on bus configuration system of FIG. 6.

FIG. 7 is a flowchart illustrating a bus configuration method 700 implemented on bus configuration system 600. The bus configuration method 700 is implemented after power on during the initialization phase of the bus (e.g., I²C or UART). It includes the following steps performed by each driver IC:

S702: Power on ready;
S704: Detect a clock signal;
S706: Configure the ports P1-P4 according to the clock signal and a port mapping rule; and
S708: Output the clock signal via the clock output port to a next driver IC.

The clock signal can optionally include an embedded check code (e.g., 110110) to avoid false detection from a glitch. If the driver IC detects the embedded check code in a received signal, it can confirm that the received signal is in fact the clock signal, thus avoiding false detection.

TABLE 3

| Rule number | P1 | P2 | P3 | P4 |
|---|---|---|---|---|
| 1 | CI | DI | DO | CO |
| 2 | DI | CI | CO | DO |
| 3 | CO | DO | DI | CI |
| 4 | DO | CO | CI | DI |

Table 3 shows the port mapping rules used in this embodiment. For example, if the port P1 detects the clock signal, the port P1 would be configured as the clock input port and the port, P2, P3 and P4 would be configured respectively as the data input port, the data output port and the clock output port. The port mapping rules can be stored in each driver IC by the manufacturer. Thus, each port function of the driver ICs can be configured in a more efficient manner.

The signal diagrams of the driver ICs in the bus configuration system 600 is similar to that of the driver ICs in the bus configuration system 100. Thus, the description is not repeated herein for brevity.

After finishing configuring each port function of all the driver ICs in the bus configuration system 600, the bus controller 610 controller would start configure a device identity for the driver IC 601 through both the clock signal line and the data signal line (i.e., via the clock input port and the data input port of the driver IC 601). For example, the bus controller 610 can name the driver IC 601 as Device Number One. Next, after the driver IC 601 receives the device identity and acknowledge itself as Device Number One, the driver IC 601 can configure a device identity for the driver IC 602 through both the clock signal line and the data signal line (i.e., via the clock input port and the data input port of the driver IC 602). For example, the bus controller 610 can name the driver IC 602 as Device Number Two. The same procedure can be repeated until the last driver IC on the daisy chain is given a device identity.

Figure 8:
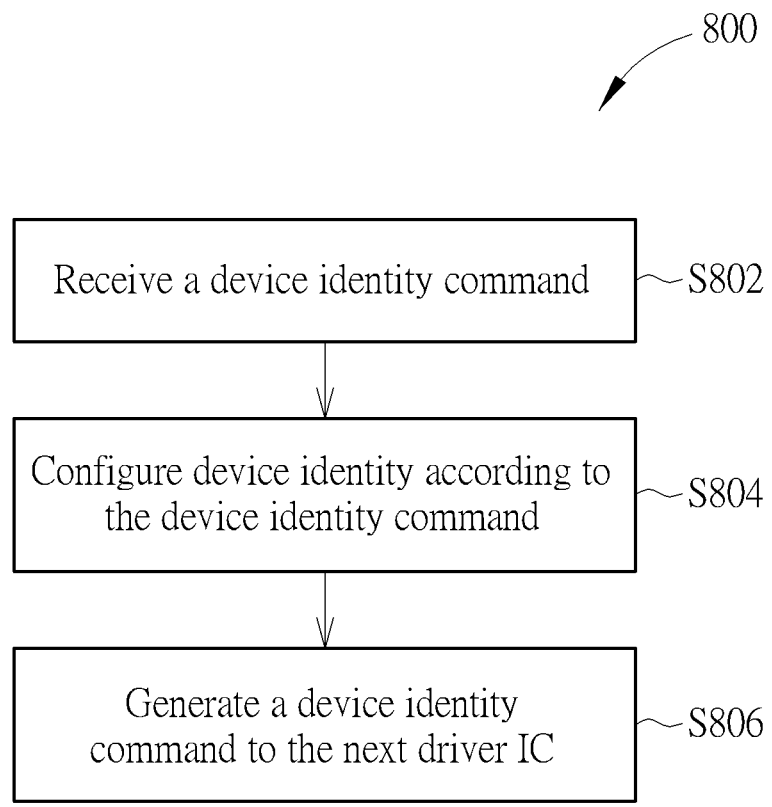
FIG. 8 is a flowchart illustrating the device identity configuration method of each driver IC in FIG. 6

FIG. 8 is a flowchart illustrating the device identity configuration method 800 of each driver IC described above. The device identity configuration method 800 includes the following steps:

S802: Receive a device identity command;
S804: Configure device identity according to the device identity command;
S806: Generate a device identity command to the next driver IC.

In step S802 the driver IC can be an Nth driver IC on the daisy chain, where N is a positive integer. After the device identity of the Nth driver IC is configured, the Nth driver IC can generate and send a device identity command for the (N+1)th driver IC on the daisy chain (in step S806) to configure the (N+1)th driver IC.

After the device identity of the last driver IC on the daisy chain is configured, the bus controller 610 can send an access command to the last driver IC on daisy chain through both the clock signal line and the data signal line. When the last driver IC receives the access command, it can send a return with its device identity back to the bus controller 610. If the device identity of the last driver IC matches the configuration stored in the bus controller 610, the bus configuration is confirmed. Then, a confirmation would be sent from the bus controller 610 to all the driver ICs on the daisy chain, making each driver IC ready to perform its function. On the other hand, if the device identity of the last driver IC does not match the configuration stored in the bus controller 610, the configuration can be discarded and bus configuration can be restarted.

However, the invention is not limited to accessing the last driver IC for confirmation. The bus controller 610 alternative can send access commands to the Nth driver IC, the (N+1)th driver IC and the (N+2)th driver IC, and determine whether the bus configuration is confirmed according the returned device identities.

By implementing the above described methods, the bus and the driver ICs can be configured much faster, thereby improving user experience.

Figure 9:
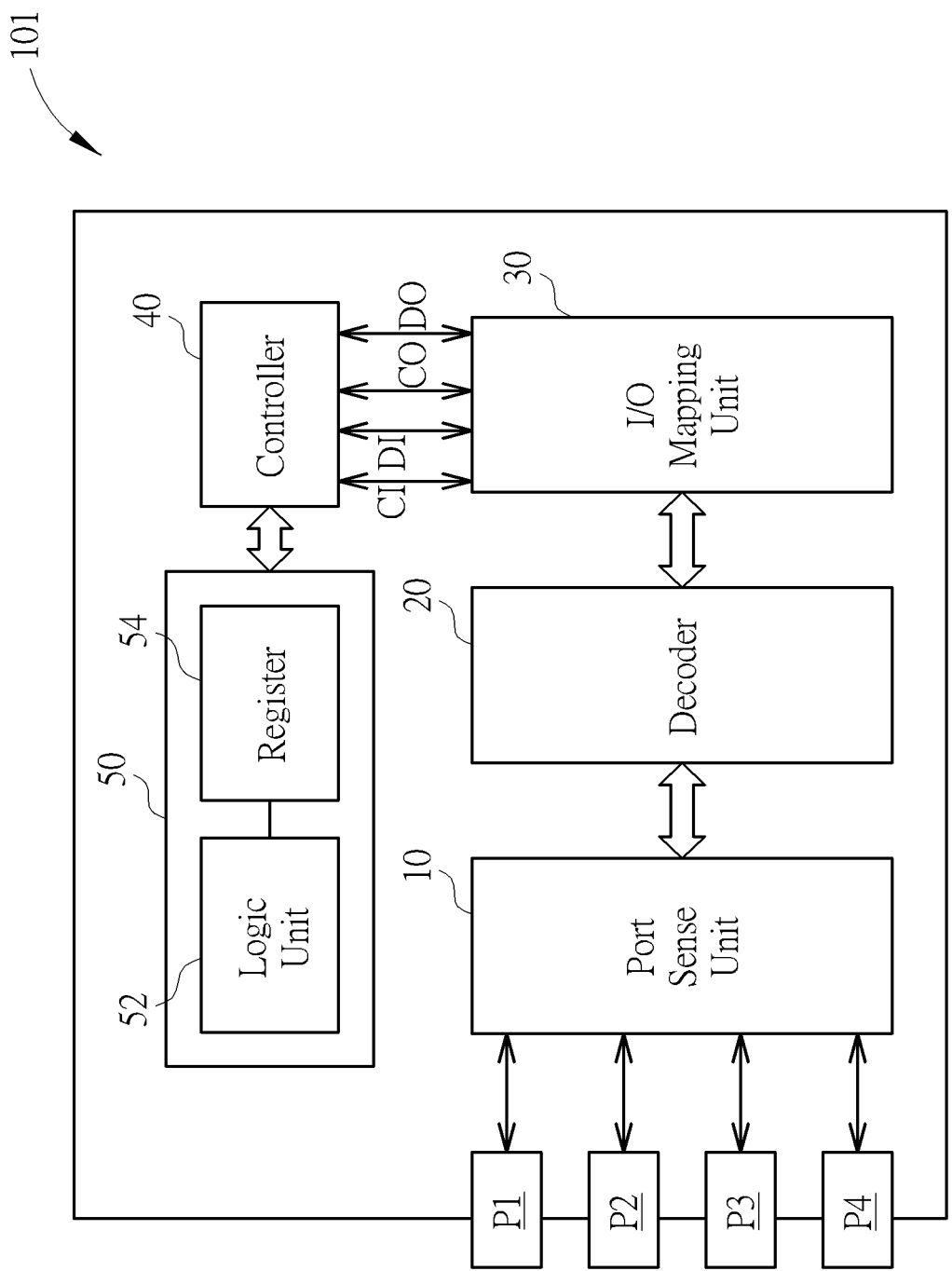
FIG. 9 illustrates architecture of the driver IC of an embodiment.

FIG. 9 illustrates architecture of the driver IC 101 of an embodiment. The driver IC 101 includes the ports P1-P4, a port sense unit 10 coupled to the ports P1-P4, a decoder 20 coupled to the port sense unit 10, an input/output (I/O) mapping unit 30 coupled to the decoder 20, a controller 40 coupled to the I/O mapping unit 30, and a processor 50 coupled to the controller 40. The processor 50 can include a logic unit 52 and a register 54 coupled to each other.

The port sense unit 10 can be used to detect when a device is connected or disconnected from a port, to identify the type of device connected, or to troubleshoot malfunctioning connections. This can involve sensing if a voltage is present on the ports, whether the voltage is driven high or low, or if there is any current flowing through the ports. The decoder 20 is responsible for interpreting and translating binary input signals into specific output signals to control a device. It acts as a bridge between the controller 40 and the external device, ensuring the correct signals are sent to activate the desired functions. The I/O mapping unit 30 is used to establish communication between the driver IC 101 and the external devices such as sensors, displays, actuators, or other peripherals. The controller 40 can be responsible for signal processing, power management, internal diagnostic and monitoring. The processor 50 can be used to interpret and execute control algorithms and perform real-time calculations and signal processing.

It should be noted that the other driver ICs described in this specification (e.g., driver ICs 102, 401, 601, etc.) can possess the same architecture. On the other hand, the architecture described herein is only an example. Alternative IC architecture can also be included and practiced according to implantation scenarios.

The various embodiments described in this specification can enable driver ICs on single-layer PCB to be connected in series without bridge or jumpers. In addition, the port configurations are flexible for the same driver IC, such that the same driver IC can fit different PCB layouts.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

The hardware and data processing apparatus used to implement the various illustrative components, logics, logical blocks, modules and circuits described in connection with the aspects disclosed herein may be implemented or performed with a general purpose single-chip processor or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software application or packaged into multiple software applications. Additionally, other implementations are within the scope of the following claims. In some cases, the actions recited in the claims can be performed in a different order and still achieve desirable results.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bus configuration system, comprising:
   a plurality of driver integrated circuits (ICs) coupled sequentially on a daisy chain, each driver IC comprising a plurality of ports; and
   a bus controller coupled to the plurality of driver ICs, and comprising a clock output port and a data output port;
   wherein when a port of the plurality of ports detects the clock signal, the port is configured as a clock input port based on the detection of a clock signal;
   in response to the clock input port being configured, the bus controller generates and transmits a port definition code based on the clock input port, the port definition code configuring the plurality of ports of each driver IC.

2. The bus configuration system of claim 1, wherein:
the clock signal comprises an embedded check code to identify the clock signal; and
if the embedded check code does not match a predefined check code, the configuration of the clock input port is discarded.

3. The bus configuration system of claim 1, wherein the port definition code is received via the clock input port.

4. The bus configuration system of claim 1, wherein a data input port, a clock output port and a data output port of the plurality of ports are configured according to the port definition code received by the each driver IC, and the clock input port is further configured by the port definition code after being configured based on detection of the clock signal.

5. The bus configuration system of claim 4, wherein the port definition code is received via the clock input port and the data input port after finishing configuring each of the plurality of ports.

6. The bus configuration system of claim 5, wherein configurations of the plurality of ports are discarded if the configurations of the clock input port and/or the data input port do not match corresponding configurations in the port definition code.

7. The bus configuration system of claim 1, wherein:
a clock input port and a data input port of the plurality of ports form a first group, and a clock output port and a data output port of the plurality of ports form a second group; and
when the clock input port is configured, the data input port is configured according to the first group.

8. The bus configuration system of claim 7, wherein the port definition code is received via the clock input port and the data input port after the clock input port and the data input port are configured.

9. The bus configuration system of claim 8, wherein configurations of the plurality of ports are discarded if configurations of the clock input port and/or the data input port do not match corresponding configurations in the port definition code.

10. A bus configuration system, comprising:
a plurality of driver integrated circuits (ICs) coupled sequentially on a daisy chain, each driver IC comprising:
a first port, a second port, a third port and a fourth port; and
a port mapping rule; and
a bus controller coupled to the plurality of driver ICs, comprising:
a clock output port and a data output port;
wherein when a clock signal is detected at one of the first port, the second port, the third port, or the fourth port of a driver IC, the port is configured as a clock input port based on detection of the clock signal;
in response to the clock input port being configured, the bus controller generates and transmits a port definition code that configures the first port, the second port, the third port, and the fourth port of each driver IC according to the port mapping rule.

11. The bus configuration system of claim 10, wherein the port mapping rule defines a respective function for the first, second, third and fourth ports in relation to the clock input port.

12. The bus configuration system of claim 10, wherein the bus controller configures a device identity for a first driver IC of the plurality of driver ICs directly coupled to the bus controller.

13. The bus configuration system of claim 12, wherein after a Nth driver IC receives a device identity, the Nth driver IC configures a device identity for an (N+1)th driver IC of the plurality of driver ICs directly coupled to the Nth driver IC, and N is a positive integer.

14. The bus configuration system of claim 13, wherein the Nth driver IC receives the device identity of the Nth driver IC via a clock input port and a data input port and configures the device identity for the (N+1)th driver IC via a clock output port and a data output port.

15. The bus configuration system of claim 10, wherein:
if a device identity for a last driver IC on the daisy chain does not match corresponding device identity configuration in the bus controller, identities of the plurality of driver ICs are discarded.

16. A bus configuration method implemented by a plurality of driver integrated circuits (ICs) coupled to a bus controller on a daisy chain connection, the method comprising:
detecting, by one of the plurality of ports of an Nth driver IC of a plurality of ICs, a clock signal transmitted from the bus controller or from a preceding driver IC, wherein N is a positive integer;
configuring the port of the Nth driver IC that detected the clock signal as a clock input port based on detection the clock signal;
in response to the clock input port being configured, generating, by the bus controller, a port definition code that defines port functions of each driver IC according to a port mapping rule;
configuring, by the Nth driver IC, its ports according to the port definition code and assigning a device identity for the Nth driver IC; and
transmitting, by the Nth driver IC, a device identity command to an (N+1)th driver IC on the daisy chain to configure the (N+1)th driver IC.

17. The method of claim 16, wherein the port mapping rule defines a respective function for each of the plurality of ports in relation to the clock input port.

18. The method of claim 16 further comprising:
confirming, by the bus controller, completion of the bus configuration based on a returned device identity from a last driver IC on the daisy chain.

19. The method of claim 18, wherein the Nth driver IC receives the device identity of the Nth driver IC via a clock input port and a data input port and configures the device identity for the (N+1)th driver IC via a clock output port and a data output port.

20. The method of claim 16 further comprising:
discarding identities of the plurality of driver ICs if a device identity for a last driver IC on the daisy chain does not match a corresponding device identity configuration in the bus controller.

* * * * *